United States Patent
Matsumoto et al.

(10) Patent No.: US 6,795,822 B1
(45) Date of Patent: Sep. 21, 2004

(54) TEXT COMMUNICATION METHOD AND TEXT COMMUNICATION SYSTEM

(75) Inventors: Yasuhide Matsumoto, Kawasaki (JP); Masahiko Murakami, Kawasaki (JP); Sumiyo Okada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/420,595

(22) Filed: Oct. 19, 1999

(30) Foreign Application Priority Data

Dec. 18, 1998 (JP) .......................................... 10-361488

(51) Int. Cl.⁷ .............................................. G06F 17/30
(52) U.S. Cl. .................................. 707/10; 707/3; 707/4; 707/100
(58) Field of Search .................. 704/1–9; 709/205–207; 707/1, 2, 3, 4

(56) References Cited

U.S. PATENT DOCUMENTS

| | | | | |
|---|---|---|---|---|
| 5,319,552 A | * | 6/1994 | Zhong | 715/535 |
| 5,384,893 A | * | 1/1995 | Hutchins | 704/267 |
| 5,410,475 A | * | 4/1995 | Lu et al. | 707/531 |
| 5,615,378 A | * | 3/1997 | Nishino et al. | 704/4 |
| 5,864,610 A | * | 1/1999 | Ronen | 379/121.01 |
| 5,875,443 A | * | 2/1999 | Nielsen | 707/2 |
| 5,915,238 A | * | 6/1999 | Tjaden | 704/260 |
| 6,029,043 A | * | 2/2000 | Ho et al. | 434/350 |
| 6,173,250 B1 | * | 1/2001 | Jong | 704/3 |
| 6,338,065 B1 | * | 1/2002 | Takahashi et al. | 707/10 |

* cited by examiner

Primary Examiner—Jean M. Corrielus
Assistant Examiner—Baoquoc N To
(74) Attorney, Agent, or Firm—Staas & Halsey LLP

(57) ABSTRACT

A text communication system is that reduces user's burden of typing text messages. An acting device is provided with a dictionary containing rules regarding conversion of text messages, with the dictionary corresponding to one or more communication devices or a user. A command that specifies whether the text message should be converted or not is sent from the communication device via the acting device. Text messages are converted according to the command. It is also possible to configure conversion mode in advance, with the conversion mode corresponding to each communication device, and convert text messages sent and received via the acting device. A user can use the same dictionary from different information devices. There is also less burden of typing text messages. It is even more preferable if the dictionary can be updated automatically according to text messages inputted at the communication terminals, since the user's burden of updating dictionaries is also relieved in this way.

16 Claims, 8 Drawing Sheets

Examples of Control Messages

| Category | Control Message | Function |
|---|---|---|
| Conversion Mode | TEXT MODE IN ON | To convert outgoing messages inputted by client |
| | TEXT MODE IN OFF | Not to convert outgoing messages inputted by client |
| | TEXT MODE OUT ON | To convert incoming messages |
| | TEXT MODE OUT OFF | Not to convert incoming messages |
| Dictionary Mode | DICMODE ON | Update dictionary based on client's input |
| | DICMODE OFF | Not to update dictionary |

Fig. 2

Dictionary - Terminal Table

| Dictionary ID | IP Address |
|---|---|
| 1 | 10.23.45.67 ; 10.23.47.89 |
| 2 | 10.23.45.* |
| 3 | 10.23.56.78 ; 10.23.67.89 |

Fig. 3

Structure of Dictionary

| Dictionary ID 1 | ID | Text | Frequency |
|---|---|---|---|
| | * | * | * |
| | * | * | * |
| | 15 | Today | 1823 |
| | * | * | * |
| | * | * | * |
| | 25 | Business Trip | 245 |
| | * | * | * |
| | * | * | * |
| | 53 | Akashi | 185 |
| | * | * | * |
| | * | * | * |
| | 58 | Kawasaki | 103 |
| | * | * | * |
| | * | * | * |

(Dictionary ID 2, Dictionary ID 3)

Fig. 4

Examples of Conversion

2

"I am going to Akashi for a business trip today."

⇩

I am going to / Akashi / for / a business trip / today

⇩

Akashi / business trip / today

Determination Table

| Pattern No. | Determination Key | Value of Key | Conversion Mode | | Dictionary Mode |
|---|---|---|---|---|---|
| | | | Outgoing | Incoming | |
| 0 | Others | * | No Convert | No Convert | ON |
| 1 | IP Address | 10.23.45.* | Convert | Convert | OFF |
| 2 | Machine Address | taro.fujitsu.co.jp | Convert | No Convert | OFF |
| 3 | Subnet | fujitsu.co.jp | No Convert | Convert | OFF |
| * | * | * | * | * | * |
| * | * | * | * | * | * |

TEXT COMMUNICATION METHOD AND TEXT COMMUNICATION SYSTEM

BACKGROUND OF THE INVENTION

A. Field of The Invention

The present invention generally relates to a technology that allows a plurality of users to communicate simultaneously sharing a single network. More specifically, the present invention relates to a text communication method and/or system that makes it easy for a user to transmit text messages over the shared network.

B. Definition of Terms

Hereinafter, a chat system refers to a system that includes a chat server and a plurality of chat clients, wherein a plurality of users using the chat clients can communicate each other simultaneously sharing a single channel.

A channel is a virtual space shared by the plurality of chat clients. A nickname is identification information that specifies a user uniquely in a chat system.

An agent terminal or acting device is a device that relays communications between the chat server and the chat clients. Preferably, an agent terminal or acting device acts as a client with respect to the chat server, and as a server with respect to the chat clients.

C. Description of The Related Art

There has been known an internet relay chat (IRC) as a system that allows text communications on a real time basis among a plurality of users. However, to conduct a text communication on a system such as IRC, a user has to type many words. In other words, the user's burden of typing messages is enormous. To reduce the typing burden, users have been registering frequently used words and idioms in a Chinese character conversion program. A user registers frequently used words and idioms in a dictionary with each of the words and idioms being associated with a certain combination of letters. The words and idioms can be obtained by typing certain combinations of letters and executing conversion thereon. Thus, text can be obtained by typing a fewer number of letters.

There has also been known a method in which frequently used texts are assigned to special keys, such that frequently used texts can be obtained by simply typing the special keys. The frequently used texts are determined from a history of typed texts.

Now that use of the internet and portable information devices increased rapidly, there are users who chat from a portable device while on a trip, from a desktop computer while at work, and from a home computer while at home. However, a keyboard of a portable device is not as easy to type as a keyboard of a desktop computer, because otherwise portable devices cannot be portable. Therefore, it is difficult to send and/or receive text messages using a portable device. The problem of typing is even greater with a chat because chatting requires a quick response.

PROBLEM TO BE SOLVED BY THE INVENTION

Several conventional methods have been developed to reduce the users' burden of typing. However, most of these conventional methods for reducing users' burden of typing have several problems. For example, in some of these prior methods, a user has to manually create a dictionary that converts a short text to a longer text. Therefore, the user still has a burden of creating the dictionary.

Moreover, in some of these prior art methods, a user has to re-create a dictionary every time the user uses a different terminal. In other words, the user has to create a dictionary many times. Consequently, the user may end up having two or more different dictionaries. For example, the user may have one in a computer that he or she uses at work, and another in a portable computer that he or she uses while on trip. This can be even more inconvenient for the user.

A user generally wants to reduce the burden of typing to a different degree depending on the type of the terminal he or she uses. For instance, a user may want to use a shortcut function to obtain a long text by typing a shorter text when he or she is using a portable device because a portable device is difficult to type. However, the same user may not need such function when he or she is using a desktop terminal. There has been no technology that allows a user to adjust the degree of reducing the burden of typing depending on the device that the user uses.

Also, since a portable device has a smaller display area to display text messages than that of a desktop terminal, long text messages may not be fully displayed.

Usually, a game device does not have a keyboard to receive inputted commands therefrom. However, there has been game devices that have an internet connection function for allowing a user to view home pages and participate in a chat system. If a user having such a game device wants to type texts to participate in a chat, the user has to create text messages by typing a software keyboard with a mouse. Since it is difficult to type texts in this manner, the user tends not to fully utilize some of the functions of the device that require typing.

In view of the above problems, there exists a need for improved text conversion method and device for a chat system which overcomes the above mentioned problems in the prior art by making it easier for a user to write and receive text massages. This invention addresses this need in the prior art as well as other needs, which will become apparent to those skilled in the art from this disclosure.

SUMMARY OF THE INVENTION

In view of the above described problems, one object of the present invention is to provide a method and a system for text communication by enabling a user to use the same dictionary from a plurality of information terminals in order to reduce the user's burden of typing and creating dictionaries.

In accordance with one aspect of the present invention, a text communication method for communication devices is adapted to send and receive a text message. The communication devices utilize an acting device, which is adapted to relay the text message. The text communication method includes steps of:

(A) providing the acting device with a dictionary containing rules regarding conversion of text messages, with the dictionary corresponding to at least one of the communication devices or a user;

(B) sending from the communication device to the acting terminal a command that specifies whether a text message sent and received via the acting device should be converted or not; and (C) converting the text message according to the command.

The communication device sends a command that specifies whether a text message should be converted or not. For instance, when the communication device establishes a connection to the acting device, it sends a command specifying whether or not to convert the text message. The acting device then configures whether text messages should be converted or not for each communication device.

Preferably, the text communication system of the present invention comprises a plurality of communication devices and an acting device. The communication devices are adapted to send and receive a text message. Each of the communication devices has reporting means for sending identification information and a command. The identification information can identify either the communication device or the user. The command specifies whether a text message should be converted or not.

The acting device is adapted to be connected with the communication devices for relaying a text message that the communication devices send and receive. The acting device has storing means and conversion means. The storing means stores a dictionary containing rules regarding conversion of text messages. The dictionary corresponds to at least one of the communication devices or the user. Upon receiving a command from one of the communication devices regarding conversion of a text message, the conversion means is adapted to convert a text message based on the dictionary corresponding to the communication device or the user.

The communication devices send and receive text messages by connecting to the acting device. Examples of communication devices that can be used with the present invention include an information terminal that runs a chat client or a portable terminal such as a pager, which simply can send and receive text messages. When these communication devices send a connection message to connect to the acting device, they also send along therewith identification information such as its own IP address that the identification information identifies the communication device or the user. The identification information can also be sent during a regular connection establishment process. The reporting means of the communication device reports to the acting device whether incoming and/or outgoing text messages should be converted based on a dictionary stored in the storing means.

The storing means of the acting device stores one or more dictionaries that correspond to at least one of the communication devices or a user. For instance, if a user A has a desktop information terminal and a portable terminal, the user A's dictionary can correspond to both these two terminals. Types of dictionaries are not limited to conventional ones such as Chinese character-Hiragana dictionary, and can be adjusted to meet user's needs.

Upon receiving a command from the communication devices, the conversion means converts text messages based on a dictionary. There are four types of conversions of text messages. First, the conversion of the text message can be performed on only inputted or outgoing text messages. Second, the conversion of the text message can be performed on only incoming text messages. Thus, the conversion of the text message can be performed on both outgoing and incoming text messages. Fourth, no conversion of the text message can be done at all.

This system of the present invention allows a user to use the same dictionary even when the user has more than one information terminals. The text communication system also allows a user to select a terminal to which text conversion should be applied. By adjusting the configuration of the dictionary, a user can selectively reduce the burden of typing. For instance, the configuration of the dictionary can be set to reduce the typing burden only when he or she is typing at a portable terminal or game terminal.

Preferably, the acting device of the text communication system further includes dictionary administration means for updating the dictionary according to a text message sent from the communication devices.

The dictionary controller or administration means updates a dictionary that corresponds to the communication terminal according to the user's input from the communication terminal. In this way, the user does not have to manually register words in the dictionary.

Preferably, the communication devices of the text communication system send to the acting device identification information that identifies the user, instead of the identification information that identifies the communication device. Thus, the dictionary in the storing means of the acting device corresponds to the users.

Examples of the communication devices include a chat client utilized in a chat system. When a chat client is utilized as a communication system, a nickname can be used as identification information since a nickname is uniquely defined in a chat system. In this case, the storing means of the acting device stores dictionaries such that dictionaries correspond to nicknames. Thus, the storing means stores a dictionary for each user. In this way, users can always chat using the same dictionary even when he or she is using a different information terminal. As a result, the user's burden of typing text for sending and receiving text messages in a text communication is reduced.

Another aspect of the present invention is the text communication method for communication devices adapted to send and receive a text message. The communication devices utilize an acting device that is adapted to relay the text message. The text communication method comprises steps of:

(A) providing the acting device with a dictionary containing rules regarding conversion of text messages;

(B) setting conversion mode of the communication devices in advance; and (C) converting the text message according to whether the conversion mode is set to "on" or "off". The dictionary corresponds to at least one of the communication devices or a user. The conversion mode specifies whether a text message sent and received via the acting device should be converted or not.

In other words, the conversion mode is configured as either "on" or "off" for each communication device, as opposed to specifying the conversion mode for each text message sent. The acting device converts text messages if required by the configuration of the conversion mode.

Still another aspect of the present invention is a text communication system, comprising communication devices and an acting device. The communication devices are adapted to send and receive a text message. The acting device is adapted to be connected to the communication devices for relaying the text message that the communication devices send and receive.

The acting device has first storing means, second storing means, and conversion means. The first storing means is adapted to store a dictionary containing rules regarding conversion of text messages. The dictionary corresponds to at least one of the communication devices or a user. The second storing means is adapted to store a determination table in which each of the communication devices specifies its conversion mode. The conversion mode shows whether a text message sent and received by the communication devices should be converted or not. The conversion means is adapted to convert a text message based on the dictionary that corresponds to one of the communication devices if required by the conversion mode of the communication device. Each of the communication devices is adapted to report to the acting device identification information that identifies the communication device or the user.

The communication devices send and receive text messages by connecting to the acting device, in a similar manner as in the aforementioned communication system. The communication devices send identification information such as its IP address, which identifies the communication device, along with, for instance, a connection message that is sent when the communication device establishes a connection with the acting device. The identification information can be any type of information other than IP address, such as machine name.

The first storing means of the acting machine stores a dictionary that corresponds to at least one of the communication devices or a user. The second storing means stores the conversion mode that specifies whether text messages sent and received by a certain communication device should be converted or not. The conversion mode corresponds to at least one of the communication devices or the user.

The conversion means determines a conversion mode based on the identification information sent by the communication devices. A dictionary that corresponds to the communication device is determined based on the identification information of the communication device or user, thereby converting the text messages using the dictionary. In this system, as in the aforementioned text communication system, a user who uses a plurality of information terminals can use the same dictionary regardless of which of the user terminals the user uses.

Preferably, the communication devices of the text communication system further include registration means. The registration means receives a name of a communication device and conversion mode inputted thereto, and sends the name of the communication device and conversion mode to the acting device. The acting device further includes table updating means for registering in the determination table the inputted name of the communication device and conversion mode.

A user inputs a combination of the name of a communication device and the conversion mode through the registration means in a communication device. The registration means receives inputs from the user, and sends the inputs to the acting device. The conversion means sends the communication of the name of a communication device and its conversion mode to the table updating means. The table updating means receives the name of the communication device and its conversion mode, and sends them to the determination table.

Preferably, the determination table of the text communication system further stores dictionary mode that shows whether the dictionary should be updated according to a text message sent from the communication devices. The dictionary mode corresponds to the communication device. The acting device further includes dictionary administration means for updating the dictionary based on the text message if required by the dictionary mode of the determination table. This text communication system has the same effects as the aforementioned text communication system.

Preferably, the communication device of the text communication system reports to the acting device identification information that identifies a user instead of the identification information that identifies the communication device. The first storing means of the acting device stores the dictionary, with the dictionary corresponding to the users. The second storing means of the acting device stores a determination table in which each of the users specifies its conversion mode.

As in the aforementioned text communication system, a communication device can be a chat client, while identification information can be a nickname. The first storing means of the acting device stores dictionaries each of which corresponds to each nickname. In other words, each dictionary corresponds to each user. The second storing means stores the conversion modes, each of which correspond to each nickname. In other words, each of the conversion modes stored corresponds to each user. As in the aforementioned text communication, users that uses more than one communication devices can chat using the same dictionary regardless of which communication device he or she uses. Therefore, user's burden of typing texts for sending and receiving text messages in text communication is reduced.

In accordance with still another aspect of the present invention, a text communication system comprises communication devices and an acting device. The communication devices are adapted to send and receive a text message. The acting device is adapted to be connected to the communication devices for relaying the text message sent and received from one of the communication devices. The communication devices have reporting means. The reporting means is adapted to report to the acting device a command regarding conversion of text messages and an identification number that is adapted to identify at least the communication device.

The acting device has first storing means, second storing means, table administration means, and conversion means. The first storing means is adapted to store a dictionary containing rules regarding conversion of text messages, with the dictionary corresponding to the communication devices. The second storing means is adapted to store a determination table in which each of the communication devices specifies its conversion mode. The conversion mode specifies whether the text message sent and received by the communication devices should be converted or not. The table administration means is adapted to update the determination table according to a command from the communication devices.

The conversion means is adapted to convert the text message based on the dictionary corresponding to the communication device if required by a command regarding conversion when the communication device sends the command regarding conversion. The conversion means converts the text message based on the dictionary corresponding to the communication device or the user if required by the conversion mode of the communication device in the determination table when the communication device does not send the command regarding conversion.

For instance, the reporting means can be configured such that the identification number of a communication device is sent along with the conversion mode of the communication device only when the communication device connects to the acting for the first time. The table administration means registers in the determination table the conversion mode and the name of the communication device that connects to the acting device for the first time. When the communication device connects to the acting device later, the conversion mode for the communication device is already registered in the determination table. Therefore the conversion mode is configured based on the determination table. If the user specifies the conversion mode even when the user's communication device has connected to the acting device before, the conversion mode specified by the user has a priority over the conversion mode registered in the determination table.

In accordance with still another aspect of the present invention, an acting device is adapted to be connected to communication devices for relaying a text message. The communication devices are adapted to send and receive a text message. The text message is sent and received by the communication devices. The acting device comprises storing means and conversion means. The storing means is adapted to store a dictionary containing rules regarding conversion of text messages, with the dictionary corresponding to at least one of the communication devices or a user. Upon receiving from the communication device a command regarding conversion of the text message and identification information of the communication device, the conversion means is adapted to convert the text message based on the dictionary corresponding to the communication device or the user if required by the command. This acting device has the same effects as the aforementioned acting device.

In accordance with still another aspect of the present invention, an acting device is adapted to be connected to communication devices for relaying a text message. The communication devices are adapted to receive and send a text message. The text message is sent and received by the communication devices. The acting device comprises first storing means, second storing means, and conversion means.

The first storing means is adapted to store a dictionary containing rules regarding conversion of text messages, with the dictionary corresponding to at least one of the communication devices or a user. The second storing means is adapted to store a determination table in which each of the communication devices specifies its conversion mode. The conversion mode specifies whether a text message sent and received by the communication devices should be converted or not. Upon receiving from the communication devices identification information that identifies the communication device or the user, the conversion means converts the text message based on the dictionary corresponding to the communication device or the user if required by the conversion mode of the communication device in the determination table. This acting device has the same effects as the aforementioned acting device.

In accordance with still another aspect of the present invention, an acting device is adapted to be connected to communication devices for relaying a text message. The communication devices are adapted to receive and send a text message. The text message is sent and received by the communication devices. The acting device comprises first storing means, second storing means, table administration means, and conversion means.

The first storing means is adapted to store a dictionary containing rules regarding conversion of the text message, with the dictionary corresponding to at least one of the communication devices or a user. The second storing means is adapted to store a determination table in which each of the communication devices specifies its conversion mode. The conversion mode specifies whether a text message sent and received by the communication devices should be converted or not.

The table administration means updates the determination table upon receiving from the communication device a command regarding conversion of the text message. The conversion means converts the text message based on the dictionary corresponding to the communication device or the user if required by the command regarding conversion when the communication device sends the command regarding conversion. The conversion means converts the text message based on the dictionary corresponding to the communication device or the user if required by the conversion mode of the determination table when the communication device does not send the command. This acting device has the same effects as the aforementioned acting device.

In accordance with still another aspect of the present invention, a computer readable recording medium has a text communication program recorded therein. The text communication program is adapted to be used in an acting device, which is adapted to be connected to communication devices for relaying a text message. The communication devices are adapted to send and receive a text message. The text message is sent and received by the communication devices. The text communication program comprises steps of:

(A) storing a dictionary containing rules regarding conversion of text messages, the dictionary corresponding to at least one of the communication devices or a user; and (B) converting the text message upon receiving from one of the communication devices a command regarding conversion of the text message and identification information that identifies the communication device or the user, based on the dictionary corresponding to the communication device or the user if required by the command regarding conversion of the text message.

This computer readable recording medium has the same effects as the aforementioned text communication device.

In accordance with still another aspect of the present invention, the computer readable recording medium has a text communication program recorded therein. The text communication program is adapted to be used in an acting device, which is adapted to be connected to communication devices for relaying a text message. The communication devices are adapted to send and receive a text message. The text message is sent and received by the communication devices. The text communication program comprises following steps A through C:

(A) storing a dictionary containing rules regarding conversion of text messages, the dictionary corresponding to at least one of the communication devices or a user;

(B) storing a determination table in which each of the communication devices specifies its conversion mode, the conversion mode specifying whether the text message received and sent by the communication device should be converted or not; and (C) converting the text message upon receiving from one of the communication devices identification information that identifies the communication device or the user, based on the dictionary corresponding to the communication device if required by the conversion mode of the communication device in the determination table.

This computer readable recording medium has the same effects as the aforementioned text communication system.

In accordance with still another aspect of the present invention, the computer readable recording medium has a text communication program recorded therein. The text communication program is adapted to be used in an acting device, which is adapted to be connected to communication devices for relaying a text message. The communication devices are adapted to send and receive a text message. The text message is sent and received by the communication devices. The text communication program comprises following steps A through D:

(A) storing a dictionary containing rules regarding conversion of text messages, the dictionary corresponding to at least one of the communication devices or a user;

(B) storing a determination table in which each of the communication devices specifies its conversion mode, the conversion mode specifying whether the text message received and sent by the communication devices should be converted or not;

(C) updating the determination table upon receiving from the communication devices a command regarding conversion of the text message; and (D) converting the text message based on the dictionary corresponding to the communication device or the user if required by the command when the communication device sends the command regarding conversion, and converting the text message based on the dictionary corresponding to the communication device or the user if required by the conversion mode of the communication device in the determination table when the communication device does not send the command. This computer readable recording medium has the same effects as the aforementioned text communication system.

BRIEF DESCRIPTION OF THE DRAWING

Referring now to the accompanying drawings which form a part of this original disclosure:

FIG. 2 is an explanatory view of examples of control messages sent from a user terminal to an agent terminal for use in text communication systems in accordance with the present invention;

FIG. 3 is a conceptual view showing the correspondence between dictionaries and users terminals in the dictionary DB for use in text communication systems in accordance with the present invention;

FIG. 4 is an explanatory view of the concept of the dictionary for use in text communication systems in accordance with the present invention;

FIG. 5 is an explanatory view illustrating how words in a text message are converted into word IDs in text communication systems in accordance with the present invention;

DETAILED DESCRIPTION OF THE INVENTION

Referring to the figures, examples of text communication systems are illustrated in accordance with preferred embodiments of the present invention. Of course, it will be apparent to those skilled in the art that the embodiments disclosed herein are only examples of the present invention, and that other embodiments are possible without departing from the scope of the invention as defined in the appended claims. The preferred embodiments of text communication systems are explained below.

First Embodiment

Figure 1:
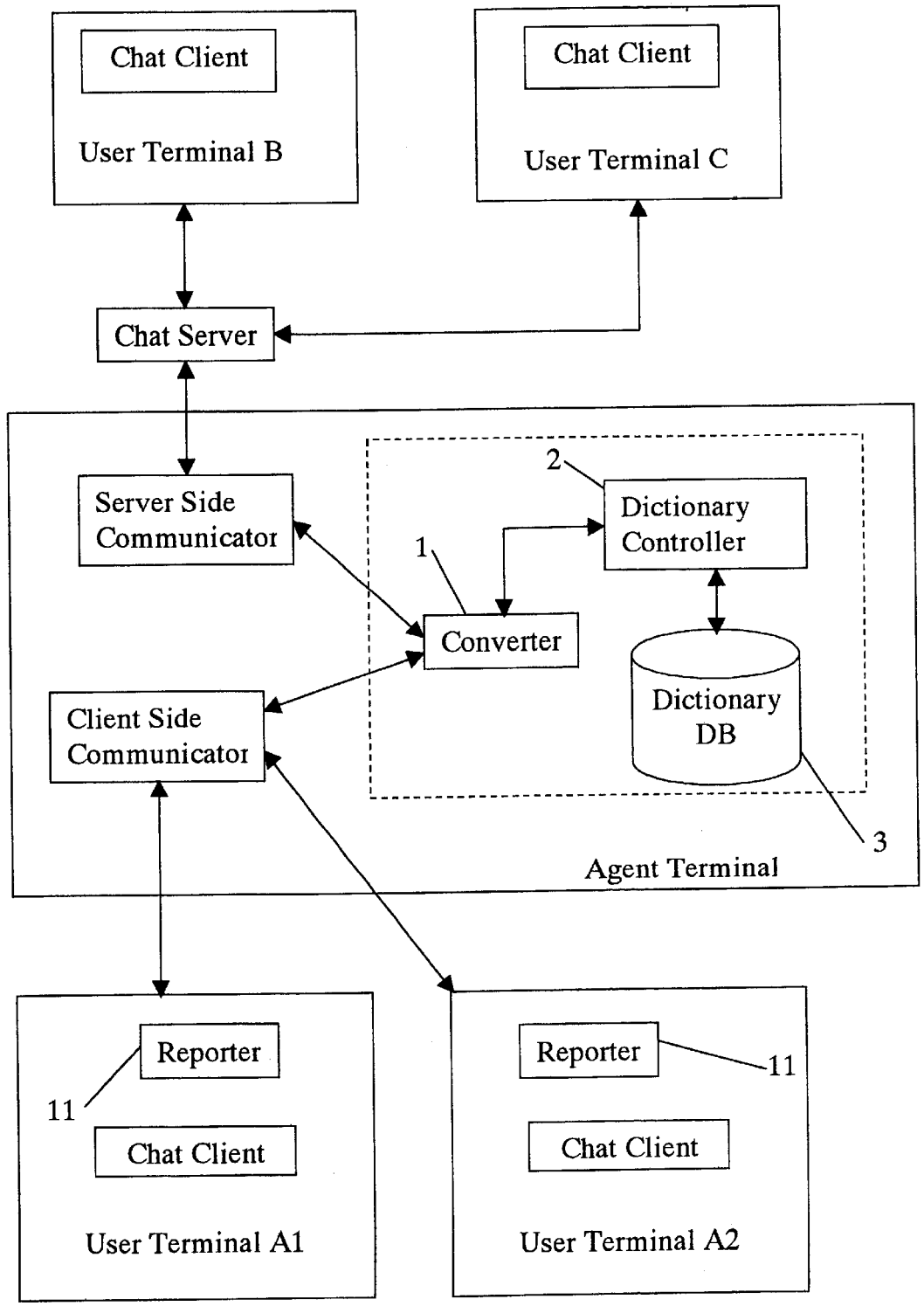
FIG. 1 is a diagrammatic block chart of text communication system in accordance with first embodiment of the present invention.

FIG. 1 shows a structure of a text communication system in accordance with a first embodiment of the present invention. The text communication system shown in FIG. 1 is a chat system having an agent terminal as an example of an acting device. In other words, the text communication system in FIG. 1 includes a plurality of user terminals as communication devices, a chat server, and at least one agent terminal, all connected via a network. Of course, other types of communication devices can be used with the present invention. Typically, one user uses a communication device or user terminal to engage in a conversation in a chat room administered by the chat server which a plurality of other users, each user at his or her own communication device or user terminal.

The chat server and the communication devices or user terminals are connected via a communication or computer network to the chat server. The communication network may be any of a variety of computer networks, including but not limited to a Local Area Network (LAN) or the Internet. The communication network allows for real time electronic communication between the communication devices or user terminals and the chat server.

The chat server may be configured to administer a plurality of chat rooms or chat channels by directing communications in and out of each individual chat channels to and from the user terminals accessing each individual chat channel. Specifically, communications are segregated. Thus, only messages sent to a specific chat channel are allowed to be transmitted to user terminals logged on to that specific chat channel.

In the description below, each chat channel is an electronic conference room having an identifier such as a name or address, unique to that chat channel. As is described in greater detail below, when the invention is used in a group e-mail application, each user of an e-mail type electronic conference room is identified in a user list. For example, each user is identified by an e-mail address such that each user has his or her own unique e-mail address.

As shown in FIG. 1, the chat system includes user terminals engaged in a conversation with one another on a chat channel administered by the chat server. Only four user terminals are depicted in FIG. 1. However, it should be understood that any number of user terminals could participate in the chat channel, so long as each user terminal is authorized to participate in communications in the electronic conference room (chat channel or chat room). It should also be understood that the user terminals are, for instance, personal computers, portable computers, handheld game units, mobile phones, pagers, or similar devices with communications capability. The user terminal preferably includes a display or monitor, a storage means such as a hard drive, a central processing unit (CPU), memory such as RAM and a means for connecting to the network such as LAN card or a modem.

In order to log onto a chat room or communicate in an electronic conference room, some kind of computer communication software application is necessary to effectively communicate with the chat server and other user terminals. The computer software may be any of a variety of software applications. However, for the purpose of describing the present application, the software application used to communicate with the electronic conference room will hereinafter be referred to as a chat client installed in each of the user terminals.

A user terminal is connected to the chat server either directly or indirectly through an agent terminal or acting device. An agent terminal acts as a server with respect to clients and as a client with respect to the server. An agent terminal or acting device executes the text conversion method in accordance with the present invention.

In this embodiment, a chat client runs on each user terminal. The user terminal herein can be any device that is able to receive and send text messages. Examples of user terminals include various information devices such as a personal computer, a portable computer, a handheld game unit, mobile phone and pager. At least some of the user terminals are connected to the chat server via the agent terminal. However, all of the user terminals do not need to be connected to the agent terminal. In an example shown in FIG. 1, two of the information or user terminals A1 and A2 that are used by user A are connected to the chat server via the agent terminal.

The agent terminal can be either on one of the user terminals or the chat server, or on a different terminal such as a dedicated terminal. When several agent terminals are employed, the agent terminals can be linked to each other, such the same effect can be obtained regardless of which of the agent terminals a user terminal is connected to. In a structure that has a plurality of agent terminals, a known agent-linking technology is used to administer linkage of the agent terminals. Since the administration of the agent terminals is well known in the art and not germane to the present invention, the description of the linking technology is omitted.

(1) Agent Terminal

An agent terminal shown in FIG. 1 includes a converter 1, a dictionary administrator or controller 2, a dictionary database (DB) 3, a server side communicator and a client side communicator. An agent terminal sends and receives text messages to/from the chat clients of the user terminals and the chat server. The agent terminal also converts text messages in the converter 1 based on information regarding text conversion for each chat client stored in the dictionary database 3.

The server side communicator of the agent terminal communicates with the chat server as an agent of a chat client. The client side communicator of the agent terminal communicates with the terminals as an agent of the chat server. In other words, the agent terminal acts as a client with respect to the chat server, and as a chat server with respect to the chat clients. Detailed descriptions of the agent functions of the agent terminal are omitted, since the functions and the structure of an agent terminal are conventional and well known in the art.

The converter 1 configures a conversion mode and a dictionary mode for each user connected to the agent terminal. The conversion mode herein determines whether text messages from a user terminal sends or receives should be converted according to conversion rules in the dictionary database 3. The dictionary mode herein determines whether the dictionary database 3 should be updated according to text messages that are inputted at one of the user terminals.

More specifically, the conversion mode and the dictionary mode are determined based on a predetermined control message that the agent terminal receives from each of the user terminals. The converter 1 determines whether a predetermined control message is sent from the user terminal, thereby configuring each mode accordingly. The control message can be included in a connection message that is sent from the user terminal to the agent terminal upon connecting to the agent terminal. The control message can also be sent any time at one of the user's request. Methods of connecting the user terminal and the agent terminal can be any conventional method, and are not limited to particular methods.

Once the converter 1 receives a control message, the converter 1 configures the conversion mode and the dictionary mode according to the control message. The converter 1 then sends commands to the dictionary controller 2 for conversion of certain text messages and/or registration of words in the dictionary database 3 according to each mode.

FIG. 2 shows examples of control messages that the agent terminal receives from the user terminals. The control messages shown in FIG. 2 are divided into two categories. The first category is control messages that relate to the dictionary mode. The second category is control messages that relate to the conversion mode. Examples of the control messages relating to the conversion mode include "TEXT MODE IN ON", "TEST MODE IN OFF", "TEXT MODE OUT ON" and "TEXT MODE OUT OFF".

The "TEXT MODE IN ON" control message is a command to convert text messages that are inputted at the user. terminal according to the dictionary registered at the dictionary database 3, and then send the converted text message to the chat server. The control message "TEXT MODE IN OFF" is a command to send text messages that are inputted at the user terminal to the chat server without converting.

The control message "TEXT MODE OUT ON" is a command to convert text messages received from the chat server according to the corresponding dictionary stored in the dictionary database 3, and then send the converted text message to the appropriate user terminal. The control message "TEXT MODE OUT OFF" is a command to send text messages received from the chat server to the appropriate user terminal without converting.

Examples of control messages that relate to the dictionary mode include "DICMODE ON" and "DICMODE OFF". The control message "DICMODE ON" is a command to update the appropriate dictionary stored in the dictionary database 3 according to text messages that are inputted at the user terminal. The control message "DICMODE OFF" is a command not to update the dictionary according to text messages inputted at the user terminal.

The dictionary controller 2 converts text messages sent from the converter 1 according to a dictionary in the dictionary database 3. The dictionary controller 2 also updates the dictionary database 3 according to commands from the user terminals via the converter 1.

The dictionary database 3 usually stores a plurality of dictionaries, with each dictionary corresponding to one or more of the user terminals. FIG. 3 shows a conceptual view of a dictionary-terminal table that shows which dictionary corresponds to which of the user terminals. In this table, a dictionary ID, which is the identification information for a particular dictionary, is matched with one or more IP addresses, which is identification information for a user terminal. As shown in FIG. 3, the dictionary ID can take any form, including a serial number assigned uniquely to each dictionary, or a nickname if the user terminal is using a chat system. User terminals can also be identified with identification information other than IP address, such as a machine name.

As shown in FIG. 3, if a user uses a plurality of user terminals, the user's dictionary can correspond to the plurality of user terminals of the user. The dictionary-terminal table can be configured manually by a user. In a chat system, the dictionary-terminal table can be created automatically by using user's nickname as the dictionary ID.

FIG. 4 shows examples of dictionaries that are stored in the dictionary database 3. The dictionaries shown in FIG. 4 are used to convert words into word IDs or vice versa. Dictionaries shown in FIG. 4 store word IDs, words, and frequency counts, all corresponding to each other. The frequency count indicates how many times the corresponding word has been used. The words are preferably sorted by the amount of frequency count. Accordingly, a word with a higher frequency preferably has a smaller word ID number.

Text messages are converted into word IDs by the dictionary controller 2. The dictionaries are updated as the text messages are converted into word IDs. FIG. 5 shows an example of how the dictionary controller 2 converts a text message into a word ID using the dictionary, and how the dictionary is updated. In FIG. 5, the dictionary controller 2 divides the inputted text message "I am going to Akashi for a business trip today." into words by configuration-analysis. After dividing the text message into words, the dictionary controller 2 filters the words and determines whether there is a word that has to be converted. In this example, the words "Akashi", "business trip" and "today", need to be converted. The processes of configuration-analysis up to filtration of words are the same as processes of regular dictionary control, and therefore these processes are not described in detail herein.

In updating the dictionary, the dictionary controller 2 finds a divided word that needs to be registered. Then the dictionary controller 2 determines whether the word is already registered in the dictionary or not. If the word is already registered, then the dictionary controller 2 increments the frequency count of the word. In this example, the words "Akashi", "business trip" and "today", are all registered in the dictionary. Therefore the frequency count of each of the words increases by "1". If the divided word were not registered in the dictionary, the dictionary controller 2 would then add the word as a new word to the end of the dictionary.

To convert a text message, the dictionary controller 2 retrieves the word ID for the divided word from the dictionary database 3, thereby replacing the words of text messages with the word IDS. In this example, the words "Akashi-business trip-today" are converted into "*15*53*25". The symbol "*" herein is an identifier that indicates the beginning of a word ID. The dictionary controller 2 then sends the text message converted into the word IDS to the converter 1.

For example, let us suppose that user A has a user terminal A1 that is a desktop information terminal, and a user terminal A2 that is a portable device. The conversion modes of the user terminal A2 are set as "TEXTMODE IN ON" and "TEXTMODE OUT ON", such that the text message typed at the user terminal A2 as "*15*53*25" is converted as "Akashi-business trip-today" by the agent terminal and then sent to other appropriate information terminals.

Once the user terminal A2 receives a text message "I am going to Akashi" for a business trip today from another information terminal, the message is converted by the agent terminal into a shorter text message "*15*53*25" and displayed as such. As for the user terminal Al, which is easy to type and display messages, the conversion mode can be set as "TEXTMODE IN OFF" and "TEXTMODE OUT OFF", such that both incoming and outgoing text messages are not converted.

In this way, user A can use the same dictionary even when the user terminals A1 and A2 are different types of portable devices. In other words, several user terminals can share the same dictionary even when the terminals have different architectures.

(2) User Terminal

The user terminal A1 shown in FIG. 1 includes a reporter 11. The reporter 11 sends to the agent terminal a connection message that lets the user terminal connect to the agent terminal, along with one or more of the control messages described above. The reporter 11 can be configured such that control messages can be sent to the agent terminal separately upon a user's request. Process Flow-First Embodiment The processes conducted by the agent terminal in accordance with the first embodiment of the present invention will now be explained below with reference to figures.

(1) Main Process

Figure 6:
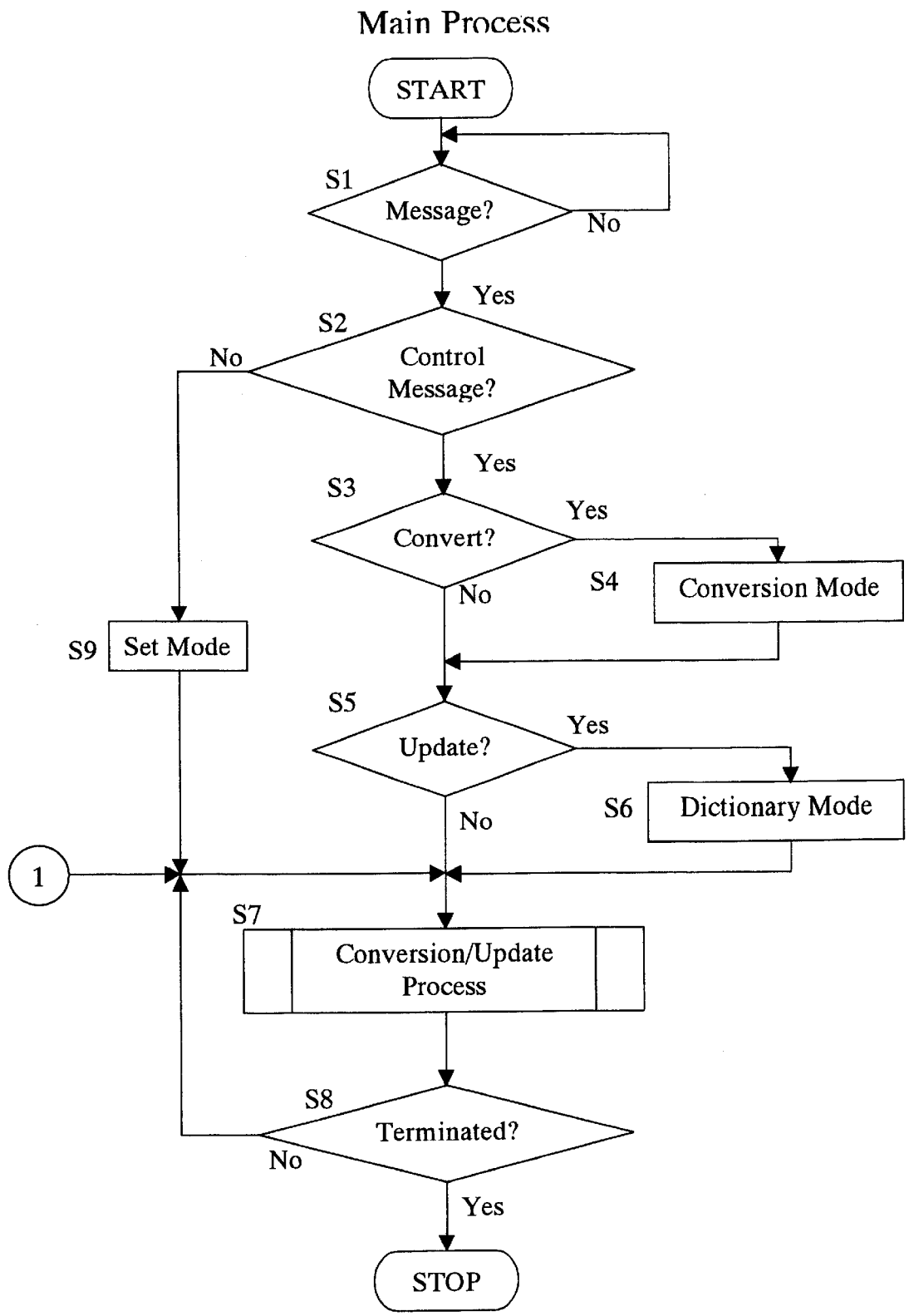
FIG. 6 is a block flowchart showing the main process that is executed by the agent terminal in accordance with selected embodiments of the present invention.

FIG. 6 is a flow chart of a preferred main process that is executed by the agent terminal in accordance with a first embodiment of the present invention. As the chat server starts, following process starts.

At step S1, the converter 1 waits for a message from either the chat server or one of the chat clients of the user terminals. Once the converter 1 receives a message from the chat server or a chat client, the agent terminal proceeds to step S2.

At step S2, the converter 1 determines whether the received message includes a predetermined control message. If the message includes a control message, the agent terminal proceeds to step S3. If there is no control message in the received message, the agent terminal proceeds to step S9, which will be described later.

At step S3, the converter 1 configures the conversion mode according to the control message received. In other words, the converter 1 determines whether the message includes a control message that relates to text conversion. If the message includes a control message relating to text conversion, the agent terminal proceeds to step S4. If the message does not include a control message relating to text conversion, the agent terminal proceeds to step S5.

At step S4, the converter 1 configures the conversion mode as either "on" or "off" according to the control message relating to text conversion.

At step S5, the converter 1 determines whether the message includes a control message relating the dictionary mode. If the message includes a control message relating the dictionary mode, the agent terminal proceeds to step S6. If the message includes no control message relating to the dictionary mode, the agent terminal proceeds to step S7.

At step S6, the converter 1 configures the dictionary mode as either "on" or "off" according to the control message relating to the dictionary mode.

At step S7, the agent terminal executes a conversion/update subroutine, which will be described later.

At step S8, the converter 1 determines whether the chat server has terminated the connection or not. If the chat server has terminated the connection, the agent terminal terminates the process. If the chat server has not terminated the connection yet, the agent terminal returns to step S1, and waits for another message.

At the above described step S2, when the converter 1 determines that the message does not include a control message, the agent terminal proceeds to step S9. At step S9, the converter 1 configures the conversion mode and the dictionary mode as predetermined default values.

Although the conversion and dictionary modes are set only when the agent terminal connects to the chat server in the process described above, the process can also be configured such that the mode can be set anytime upon user's request.

(2) Conversion/Update Process

Figure 7:
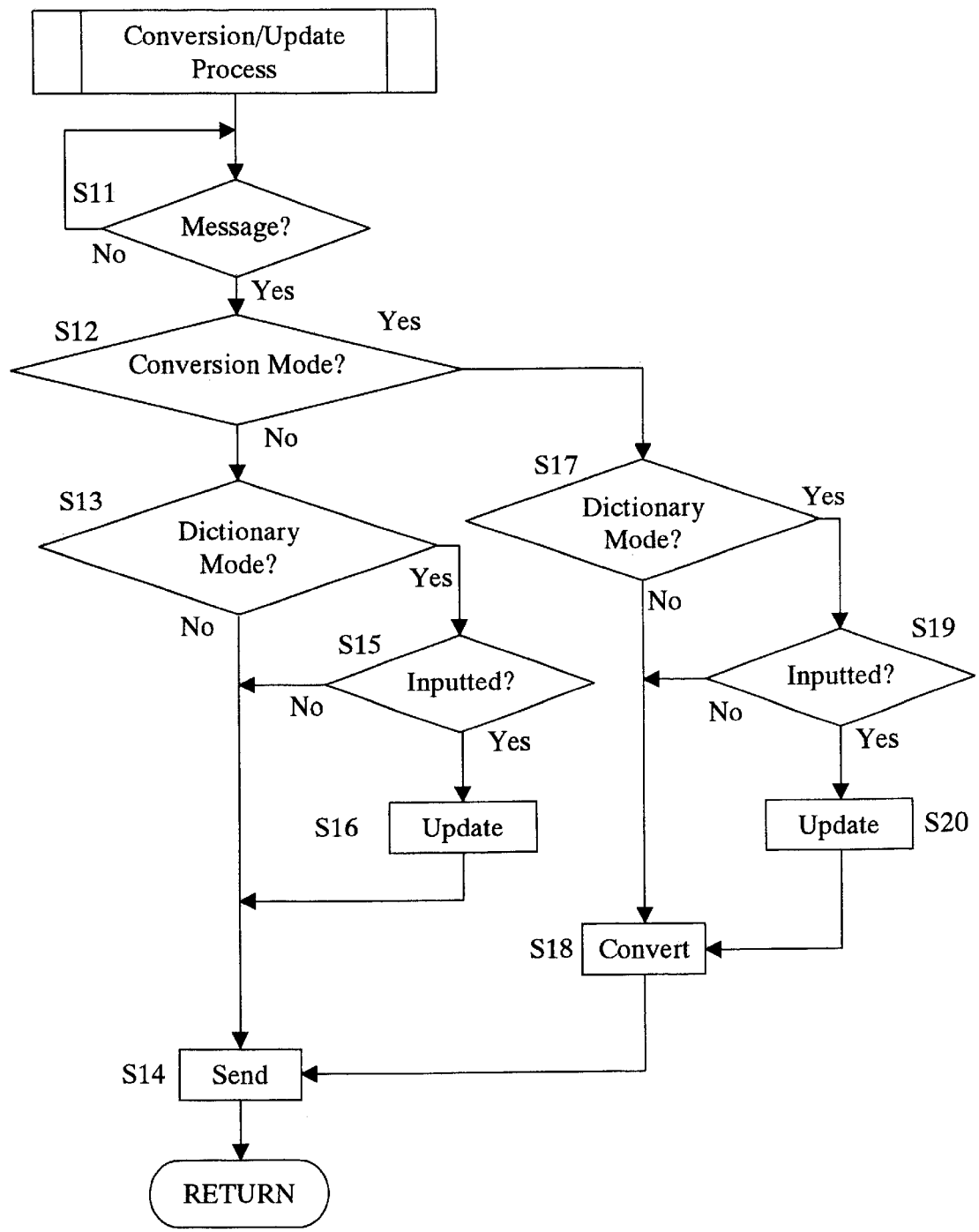
FIG. 7 is a block flowchart showing the conversion/update process executed by the agent terminal in accordance with selected embodiments of the present invention.

The conversion/update process is executed at step S6 of the main process. FIG. 7 shows a flow chart of the conversion/update process executed by the agent terminal.

At step S11, the converter 1 waits for a text message sent either by the chat server to be received by a user terminal, or by a user terminal to be received by another user terminal. When the converter 1 receives a text message, the agent terminal proceeds to step S12.

At step S12, the converter 1 determines whether the conversion mode is set as "on" or "off". If the conversion mode is "off", the agent terminal proceeds to step S13. If the conversion mode is "on", the agent terminal proceeds to step S17. Step S17 will be described later.

At step S13, the converter 1 determines whether the dictionary mode is "on" or "off". If the dictionary mode is "off", the agent terminal proceeds to step S14. In other words, the conversion mode and dictionary mode are both "off" at step S14. If the dictionary mode is "on", the agent terminal proceeds to step S15.

At step S14, the text message is sent to either the server side communicator or the client side communicator depending on where the text message is supposed to be sent to.

In this case, the agent terminal does not convert the text message nor update the dictionary, regardless of whether or not the text message has been converted when it was received. As will become apparent, the converter 1 at step S14 sends both the converted and the non-converted text messages to the server side communicator or the client side communicator.

If the dictionary mode is "on" at step S13, the agent terminal proceeds to step S15. In other words at step S15, the text message does not need to be converted, while the dictionary needs to be updated according to the text inputted by the user.

At step S15, the converter 1 determines whether the text message has been inputted at one of the user terminals. In other words, the converter 1 determines whether the text message is an outgoing message that the client side communicator has received or incoming message that the server side communicator has received from the chat server for relaying to the user terminal. As used herein, the term "outgoing message" means a message that has been inputted at the user terminal and is to be forwarded by the agent terminal to another terminal or communication device. As used herein, the term "incoming message" means a message that has been sent from the chat server to the user terminal.

If the text message is an outgoing message that was inputted at the sending user terminal, the agent terminal proceeds to step S16. At step S16, the dictionary is updated according to the inputted text. If the text message is an incoming message that has been sent from the chat server to the user terminal, the agent terminal proceeds to the above described step S14. The dictionary will not be updated if the text message is an incoming message since the dictionary is updated only according to user's input in this process.

At step S16, the dictionary needs to be updated. The converter 1 sends a content of a text to the dictionary controller 2, which analyzes the text message using a predetermined method. The dictionary controller 2 then updates the dictionary by registering words contained in the text message in the dictionary database 3, and/or by incrementing the frequency count of the words that are already included in the text message.

If the conversion mode is "on" at step S12, the agent terminal proceeds to step S17. At step S17, the converter 1 determines whether the dictionary mode is "on" or "off". If the dictionary mode is "off", the agent terminal proceeds to step S18. In other words at step S18, the converter 1 of the agent terminal converts the text message, while the dictionary is not updated. If the dictionary mode is "on", the agent terminal proceeds to step S19.

At step S18, the converter 1 sends the text message to the dictionary controller 2. The dictionary controller 2 analyzes the received text message using a predetermined method. The text message can be converted from words into word IDs or vice-a-versa.

If text message is be converted from words into word IDS, the predetermined method analyzes the received text message and divides the text message into individual words as seen in FIG. 5. The dictionary controller 2 then converts the divided words into word IDs based on the dictionary database 3 as seen in FIG. 5. Then, the dictionary controller 2 sends to the converter 1 the converted text message, in which words are converted to word IDs. The converter 1 sends the text message to either the server side communicator or the client side communicator, depending on whether the text message is an incoming or outgoing message.

If text message is be converted from word IDs into words, the predetermined method analyzes the received text message and then converts word IDs of the text message into a sentence which is the opposite direction shown in FIG. 5. This can be accomplished by the converter 1 and the dictionary controller 2 converting word IDs into words based on the dictionary database 3. Then, the converter 1 sends the text message to either the server side communicator or the client side communicator, depending on whether the text message is an incoming or outgoing message.

If the dictionary mode is "on" in the above described step S17, the agent terminal proceeds to step S19. In this case, the conversion mode and the dictionary mode are both "on". At step S19, the converter 1 determines whether or not the text message is an outgoing message that has been inputted at the user terminal. If the text message is an outgoing message that has been inputted at the user terminal, the agent terminal proceeds to step S20. At step S20, the dictionary is updated according to the user's input. If the message is an incoming message that has been sent from the chat server to the user terminal, the agent terminal proceeds to the above described step S18. In this way, the agent terminal only converted the text message without updating the dictionary, since the dictionary in this process needs to be updated only according to user's input.

Although the dictionary is updated only according to user's input in this process, the process can also be configured such that the dictionary is updated as needed according to other users' text messages.

Second Embodiment

Figure 8:
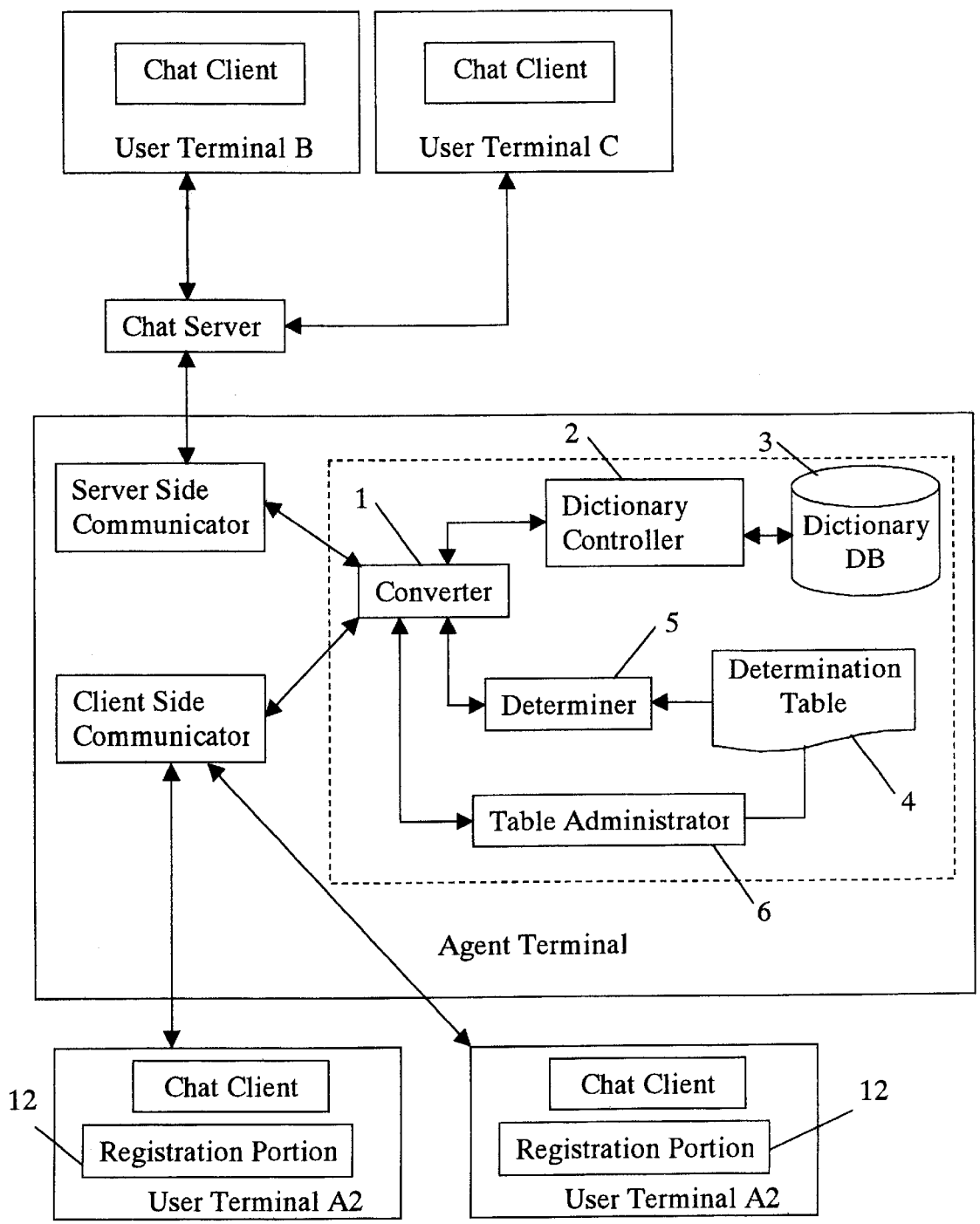
FIG. 8 is a diagrammatic block chart showing the structure of the text communication system in accordance with a second embodiment of the present invention.

A text communication system in accordance with a second embodiment of the present invention will now be explained below with reference to FIG. 8. FIG. 8 shows a diagrammatic structure of the text communication system in accordance with the second embodiment. The text communication system shown in FIG. 8 is preferably a chat system having an agent terminal, which is similar to the text communication system of the first embodiment. The text communication system of the second embodiment has similar user terminals and the agent terminal as those of the first embodiment of the present invention.

The agent terminal in accordance with the second embodiment can configure modes of a plurality of user terminals. More specifically, the agent terminal is provided with multiple configuration patterns such that the configuration patterns encompass all the user terminals connected to the agent terminal. The configuration patters are provided by user terminals. A configuration pattern specifies configuration of the conversion mode and the dictionary mode, and to which of the user terminals the configuration applies.

(1) Agent Terminal

An agent terminal shown in FIG. 8 is the agent terminal of the first embodiment, discussed above, but further includes a determination table 4, a determination portion 5, and a table administrator 6. The configuration patterns are stored in the determination table 4 by the table administrator 6. Determination portion 5 applies one of the configuration patterns to each user terminal.

Figures 9, 10:
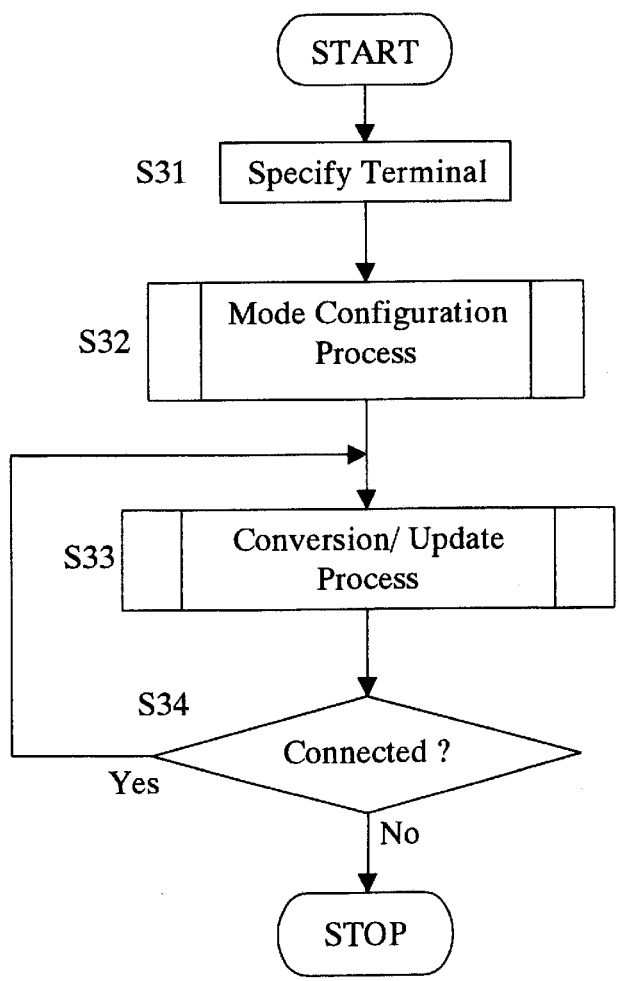
FIG. 9 is an explanatory view of the determination table for use in text communication systems in accordance with selected embodiments of the present invention.
FIG. 10 is a block flowchart showing the main process that is executed by the agent terminal in accordance with the second embodiment of the present invention.

FIG. 9 shows a conceptual view of the determination table 4. For each configuration pattern, the determination table 4 includes a determination key, value of the determination key, a conversion mode and a dictionary mode. Specifically, the determination key specifies the type of information to be utilized to identify user terminals to which the configuration pattern applies. For instance, if the determination key of a certain configuration pattern is an "IP address", then the IP address of the user terminal is compared with the value of the determination key to determine which of the certain configuration patterns applies to a particular user terminal. In the example shown in FIG. 9, the configuration pattern "1" applies to user terminals having an IP address that starts with "10.23.45".

If the determination key of a certain configuration pattern is "machine address", then the machine address of the user terminal is compared with the value of the determination key to determine which of the configuration patterns applies to a certain user terminal. In the example shown in FIG. 9, configuration pattern "2" applies to user terminals whose machine address is "taro.fujitsu.co.jp".

If the determination key of a certain configuration pattern is "subnet", then the subnet of the user terminal is compared with the value of the determination key to determine which of the configuration patterns applies to a certain user terminal. In the example shown in FIG. 9, the configuration pattern "3" applies to user terminals whose subnet of the machine address is "fujitsu.co.jp". Configuration pattern "3" also applies to user terminals whose machine address is "taro.fujitsu.co.jp". In other words, configuration pattern "3" is applicable to the user terminals to which configuration pattern "2" is applicable. However, since the user terminals whose machine address is "taro.fujitsu.co.jp" are first categorized as configuration pattern "2", the determination portion 5 does not determine whether the configuration "3" applies to these user terminals.

The configuration pattern "0" is the default configuration pattern. If a user terminal does not fall under any of the configuration patterns, the default configuration pattern applies to the user terminal. Thus, the conversion mode and the dictionary mode are configured such that text message conversion and dictionary update are executed to the default configuration pattern. Therefore, determination key and the value of the determination key for the configuration value "0" are configured so as to apply to all of the user terminals.

When a portable device is used as a user terminal, a determination key for the user terminal can be information that specifies a gateway device that connects the portable device to the internet.

The determination portion 5 determines which of the configuration patterns applies to each user terminal that is connected to the agent terminal. The configuration pattern is determined according to identification information of the user terminal, which is sent to the agent terminal when the user terminal connects to the agent terminal. The determination portion 5 also retrieves the conversion mode and the dictionary mode from the determination table 4 under the configuration pattern that applies to the user terminal. Thereafter, the determination portion 5 sends the conversion mode and the dictionary mode to the converter 1.

The table administrator 6 receives from the converter 1 each of the modes that the user manually configured at the user terminal. In this way, the user-inputted modes are registered in the determination table 4 so as to identify the user terminal to which the modes apply. The identification information of a user terminal can take form of any of the information utilized as determination key in the determination table 4, including for instance, IP address, machine address and subnet.

The converter 1, the dictionary controller 2, and the dictionary database 3 in accordance with the second embodiment function in substantially the same way as in the first embodiment except in the situations explained below. When the user terminal is connected to the agent terminal, the converter 1 commands the determination portion 5 to read the determination table 4. The converter 1 sets the conversion mode and the dictionary mode according to the modes reported by the determination portion 5.

The value of the determination key and the modes of the user terminal are registered in the determination table 4 by the table administrator 6 according to a report received from the registration portion 12 in a user terminal. Detail of the registration portion 12 will be described later.

(2) User Terminal

The user terminal shown in FIG. 8 is similar to the user terminal of the first embodiment, further including a registration portion 12, through which a configuration pattern is registered at the agent terminal. The registration portion 12 receives user's input, and reports the inputted modes to the agent terminal with the identification information of the user terminals to which the modes apply.

Process Flow—Second Embodiment (1) Main Process

A process flow executed by the agent terminal in accordance with the second embodiment of the present invention is explained with reference to FIGS. 8–11. Referring to FIG. 10, a flow chart of a main process is illustrated, which is executed by the agent terminal in accordance with the second embodiment of the present invention. The following process starts as one of the user terminals connects to the chat server via the agent terminal by sending a connection message to the agent terminal.

At step S31, the converter 1 retrieves identification information of the connecting user terminal from the connection messages exchanged between the user terminal and the agent terminal. More specifically, the converter 1 retrieves information such as IP address and machine address from the connection message sent to the agent terminal from the connecting user terminal. The converter 1 then sends the retrieved identification information to the determination portion 5.

At step S32, mode configuration process subroutine is executed. Details of the mode configuration process will be described later with reference to FIG. 11.

At step S33, the conversion/update process subroutine is executed. The conversion/update process is illustrated in FIG. 7 and described above with reference to the first embodiment of the present invention.

At step S34, the converter 1 determines whether the user terminal is still connected to the agent terminal. If the user terminal is connected, the agent terminal goes back to step S33, whereby conversion and dictionary update are executed on new text messages according to the configured modes. If the connection is terminated, the process is terminated.

(2) Mode Configuration Process

Figure 11:
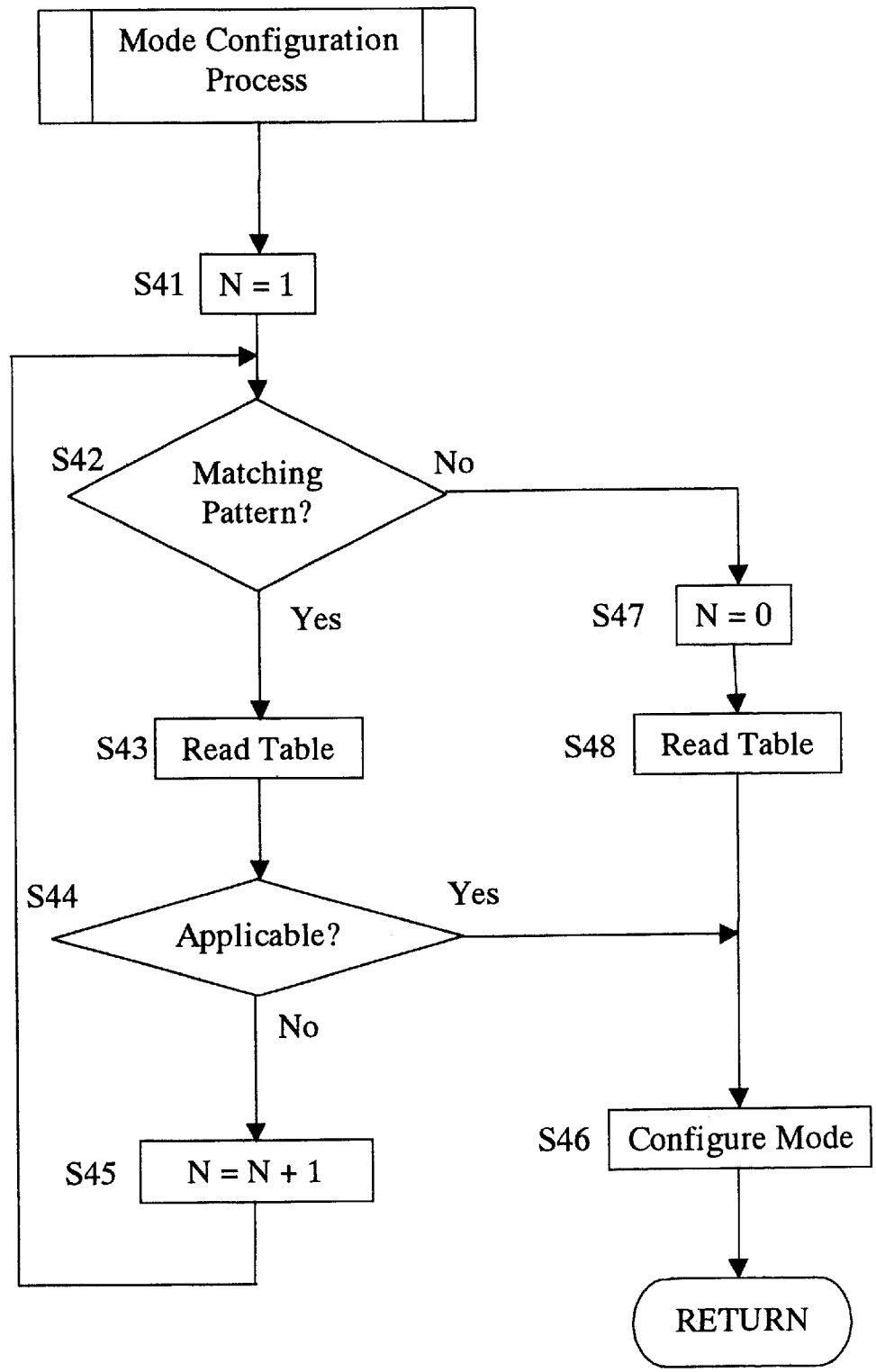
FIG. 11 is a block flowchart showing the mode configuration process executed by the agent terminal in accordance with the second embodiment of the present invention.

Referring now to FIG. 11 a flow chart of the mode configuration process subroutine is illustrated, which is executed by the determination portion 5 of the agent terminal. Once the agent terminal proceeds to step S32 of the main process shown in FIG. 10, the following processes start.

At step S41, the value of "N", which is a configuration pattern number, is set as "1".

At step S42, the determination portion 5 determines whether there is a configuration pattern that corresponds to the current value of the configuration pattern number. If the determination portion 5 determines that there is a configuration pattern whose configuration pattern number is "N", the determination portion 5 proceeds to step S43. If there is not, the determination portion 5 proceeds to step S47.

At step S43, the determination portion 5 retrieves entries of the determination table 4 under the configuration pattern "N".

At step S44, the determination portion 5 determines the value of the determination key using the identification information of the connecting user terminal. The determination portion 5 then compares the value of the determination key with the value of the determination key under the configuration pattern "N" from the determination table 4. If the value of the determination key of the user terminal coincides with value under the configuration pattern "N", the determination portion 5 proceeds to step S46. The value of the determination key under the configuration pattern "N" should be, for instance, the same IP address as that of the user terminal if the determination key of the configuration pattern "N" is IP address. If the value of the determination key of the user terminal does not coincide with the value under the configuration pattern "N", the determination portion 5 proceeds to step S45.

At step S45, the determination portion 5 increments the configuration value "N" to find another configuration pattern that may be applicable to the user terminal.

At step S46, the value of the determination key of the user terminal coincides with the value under the configuration pattern "N". Thus, at step S46, the determination portion 5 sends the conversion mode and the dictionary mode, which are retrieved from the determination table 4, to the converter 1. The converter 1 configures the conversion mode and the dictionary mode of the user terminal according to the modes sent from the determination portion 5.

At the above described step S42, if the configuration pattern "N" is not found in the determination table 4, the determination portion 5 proceeds to step S47. At step S47, the configuration value "N" is set as "0", then the determination portion 5 proceeds to step S48.

At step S48, the determination portion 5 retrieves from the determination table 4 entries under the configuration pattern "N=0". In other words, the determination portion 5 retrieves from the determination table 4 the default values of the conversion mode and the dictionary mode. Then, the determination portion 5 proceeds to the above described step S46, where the converter 1 configures each of the modes as the default values. The converter now executes the text conversion and dictionary update accordingly.

Other Embodiments

It is also possible to combine the first embodiment and the second embodiment. In other words, one or more of the user terminals in accordance with the second embodiment can further include a reporter 11. If the conversion mode and/or the dictionary mode are reported from the user terminal, the converter 1 uses the reported modes. For example, the modes are reported from the user terminal when the user terminal establishes a connection with the agent terminal. The converter 1 then sends to the table administrator 6 the modes reported by the user terminal and the identification information of the user terminal. The table administrator 6 registers the reported information in the determination table 4.

If a mode is not reported from the user terminal when the user terminal establishes a connection with the agent terminal, the converter 1 commands the determination potion 5 to read the determination table 4. The converter 1 then configures the conversion mode and the dictionary mode according to the modes reported by the determination portion 5. When the registration portion 12 sends modes to the agent terminal later, the table administrator 6 registers the user terminal and the reported modes in the determination table 4.

The first and second embodiments can be further modified such that the multiple dictionaries are administered with nicknames of users, by making the nicknames correspond to the conversion mode and the dictionary mode. If a user who uses more than one user terminals and needs the conversion mode configured differently for the user terminals, the conversion mode needs to be configured for each terminal that the user uses.

Although the first and second embodiments deal with text message communication based on chat clients provided in user terminals, the text communication system in accordance with the present invention can also be utilized in user terminals that do not have chat client but have a function of sending and receiving text messages other than a chat client.

While several embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A text communication method for use with communication devices adapted to send and receive text messages over a network, at least some of the communication devices utilizing an acting device adapted to relay text messages between the communication devices and a communication server providing text message communication among the communication devices, said text communication method comprising:

providing the acting device, on the network, with a dictionary containing rules regarding conversion between words and word IDs that specify the words, with the dictionary corresponding to at least one of the communication devices or a user, where the acting device sends and/or receives the text messages to and/or from at least some of the communication devices over the network;

providing for sending from the one communication device to the acting device a conversion command that specifies whether text messages sent over the network to and/or from the one communication device via the acting device should be converted or not by the acting device, and based on the conversion command the acting device determines accordingly whether or not to convert the text messages of the one communication device with the dictionary;

providing a determination table specifying a conversion mode for at least some of said communication devices, where a communication device's conversion mode indicates whether or not to convert its text messages;

using the determination table to determine at the acting device whether or not to convert the text messages with the dictionary; and at the acting device, converting the text messages with the dictionary when so determined, and relaying the converted and unconverted text messages between the one communication device and the communication server.

2. A text communication system, comprising:

a plurality of communication devices adapted to send and receive text messages over a network, each of said plurality of communication devices having a reporting unit to send identification information and a command, the identification information identifying either the communication device or a user, the command specifying whether a text message should be converted or not; and an acting device, located on a network, adapted to be connected with said communication devices relaying over the network converted and unconverted text messages that said communication devices send and receive over the network, said acting device having a storing unit and conversion unit, said storing unit storing a dictionary containing rules regarding conversion between word IDs and words, with said dictionary corresponding to at least one of said communication devices or a user, said conversion unit adapted to convert words or word IDs in text messages to and/or from the communication devices, and converting for a communication device after receiving from said communication device a command regarding conversion, where the converting is based on the dictionary corresponding to the communication device which sent the command, and where the acting device is provided with a determination table specifying for each of said communication devices a conversion mode, where a communication device's conversion mode indicates whether or not to convert its text messages, and where the determination table can be used to determine whether or not the conversion unit converts the text messages based on the dictionary.

3. The text communication system set forth in claim 2, wherein said acting device further includes dictionary administration means for updating the dictionary according to text messages sent from said communication devices.

4. The text communication system set forth in claim 2, wherein said communication devices send to said acting device identification information that identifies the user; and said dictionary that said storing unit of said acting device stores corresponds to the user.

5. A text communication method for communication devices adapted to send and receive text messages over a network, the communication devices utilizing an acting device adapted to relay their text messages, said text communication method comprising:

providing the acting device with a dictionary containing rules regarding conversion of text, with the dictionary corresponding to at least one of the communication devices or a user and a determination table in which each of said communication devices specifies a conversion mode indicating whether its text messages should be converted or not;

setting in the determination table the conversion mode of at least some of the communication devices in advance;

allowing the acting device to obtain or make a determination of whether or not to convert a communication device's text messages based on its conversion mode in the determination table; and at the acting device, with the dictionary containing the rules regarding conversion of text, converting the text messages of a given communication device according to a conversion determination based on whether the conversion mode is set to on or off for that given communication device, where the acting device relays the converted text messages so that they can be received by another communication device.

6. A text communication system, comprising:

communication devices adapted to send and receive text messages over a network; and an acting device adapted to be connected to said communication devices for relaying the text messages that said communication devices send and receive over the network, said acting device comprising:

a first storing unit storing a dictionary containing rules regarding conversion of text, with said dictionary corresponding to at least one of said communication devices or a user, a second storing unit storing a determination table in which each of said communication devices specifies a conversion mode indicating whether its text messages should be converted or not, and a conversion unit adapted to convert text messages based on said dictionary corresponding to at least one of said communication devices or a user, with each of said communication devices adapted to report to said acting device identification information that identifies the communication device, where the conversion unit converts the text messages of an identified communication device according to the communication device's conversion mode.

7. The text communication system set forth in claim 6, wherein said communication devices further include a registration unit receiving a name of a communication device and conversion mode inputted thereto, and sending the name of the communication device and the conversion mode to said acting device; and said acting device further includes a table updating unit registering in said determination table the inputted name of the communication device or the user and conversion mode.

8. The text communication system set forth in claim 6, wherein said determination table further stores dictionary mode that shows whether said dictionary should be updated according to a text message sent from said communication devices, with the dictionary mode corresponding to the communication device or the user; and said acting device further includes a dictionary administration unit updating said dictionary according to a text message if required by the dictionary mode in said determination table.

9. The text communication system set forth in claim 6, wherein said communication device reports to said acting device identification information that identifies the user; said first storing unit of said acting device stores said dictionary, with said dictionary corresponding to the user; and said second storing unit of said acting device stores a determination table in which each of the users specifies its conversion mode.

10. A text communication system comprising:

communication devices adapted to send and receive text messages over a network, at least one or more of said communication devices having a reporting unit; and an acting device adapted to be connected to said communication devices and relaying the text messages sent and received from one of said communication devices, said acting device comprising:

a first storing unit storing a dictionary containing rules regarding conversion of text, with said dictionary corresponding to at least one of said communication devices or a user, a second storing unit storing a determination table in which each of said communication devices specifies a conversion mode, where a communication device's conversion mode indicates whether its text messages should be converted or not, a table administration unit updating a communication device's conversion mode in said determination table according to a command from said communication device, and a conversion unit converting the text messages for an identified communication device based on said dictionary corresponding to the communication device or the user if and when required by a conversion command sent to the acting device by the communication device, and converting the text messages based on said dictionary corresponding to the communication device or the user if so indicated by the conversion mode of the communication device when the communication device does not send the conversion command, with said reporting unit adapted to report to said acting device the command regarding conversion of text messages and identification information that identifies at least the communication device or the user and thereby identifies its conversion mode.

11. A computer readable recording medium having a text communication program recorded therein, said text communication program adapted to be used in an acting device, the acting device being adapted to be connected over a network to communication devices and for relaying text messages between the communication devices and a server providing text message communication among the communication devices, the text messages being sent and received by the communication devices, said text communication program performing a process comprising:

storing a dictionary, on the network, containing rules regarding conversion between words and word IDs, said dictionary corresponding to at least one of the communication devices or a user, where the acting device sends and/or receives the text messages to and/or from at least some of the communication devices over the network;

providing a determination table specifying a conversion mode for at least some of said communication devices, where a communication device's conversion mode indicates whether or not to convert its text messages;

using the determination table to determine at the acting device whether or not to convert the text messages with the dictionary; and using the dictionary to convert between words or word IDs in the text messages of an identified communication device after receiving from the communication device a conversion command and identification information that identifies the communication device or the user if required by the conversion command.

12. A computer readable recording medium having a text communication program recorded therein, said text communication program adapted to be used in an acting device, the acting device being adapted to be connected over a network to communication devices and for relaying text messages sent and received by the communication devices, said second communication program performing a process comprising:

storing a dictionary containing rules regarding conversion of text, said dictionary corresponding to at least one of the communication devices or a user;

storing a determination table in which each of the communication devices specifies a conversion mode, where a communication device's conversion mode indicates whether its text messages should be converted or not; and converting the text messages of an identified communication device after receiving from the communication device identification information that identifies the communication device or the user, and converting the text messages based on the dictionary corresponding to the communication device or the user if required by the conversion mode of the communication device.

13. A computer readable recording medium having a text communication program recorded therein, said text communication program adapted to be used in an acting device, the acting device being adapted to be connected over a network to communication devices and for relaying text messages sent and received by the communication devices, said text communication program performing a process comprising:

storing a dictionary containing rules regarding conversion of text, said dictionary corresponding to at least one of the communication devices or a user;

storing a determination table in which each of the communication devices specifies it's a conversion mode, where a communication device's conversion mode indicates whether its text messages should be converted or not;

updating a communication device's conversion mode in the determination table after receiving from the communication device a conversion command; and converting the text messages of a communication device based on the dictionary corresponding to the communication device or the user if required by the conversion command after the communication device sends the conversion command, and converting the text message based on the dictionary corresponding to the communication if required by the un-updated conversion mode of the communication device communication device when it does not send the conversion command.

14. The text communication system set forth in claim 2, wherein said acting device further includes a dictionary administration unit updating the dictionary according to a text message sent from said communication devices that stores a frequency at which the word is used and sorts the dictionary according to the frequency.

15. A method of relaying network text messages, where, at a client hosted on a device, a text message with shorthand codes has been composed by a user, where the client is one of a plurality of text communication clients adapted for users to send and receive text messages over a network, where the text message has been sent by the client and over the network to an intermediary, where the intermediary is adapted to send and/or receive text messages sent to and/or from at least some of the clients over the network, the method comprising:

at the intermediary, responsive to receiving the text message sent by the client, obtaining a determination of whether to perform conversion mapping for the client that sent the text message by referring to a plurality of conversion settings which have been set to indicate conversion modes to be used for determining whether to perform conversion for clients that use the intermediary as a text message relay, where a conversion mode indicates a mode of conversion for a sender and/or receiver of a text message to be relayed by the intermediary, and if conversion is indicated by the determination, the intermediary:

selecting a conversion mapping dictionary based on an identity of the device or based on an identify of the user thereof;

using the selected conversion mapping dictionary to generate a converted version of the text message with words in place of the shorthand codes, the words having been matched to the codes using the selected conversion mapping dictionary; and relaying the converted text message by sending the converted text message, with its shorthand codes converted to the words, to a server providing networked text discussion; and if conversion is not indicated by the determination, then from the intermediary, relaying the text message to the server without conversion by the intermediary.

16. A method according to claim 1, wherein when a command is not sent the acting device determines whether to convert or not convert the text message with the dictionary according to the determination table.

\* \* \* \* \*